(No Model.)

W. A. HEATH.
VALVE FOR AIR COMPRESSORS.

No. 527,787. Patented Oct. 23, 1894.

Witnesses:
Nellie McKibben
Ralph Vandyke

Inventor
Walter A. Heath
by Bond, Adams & Pickard
Attorneys.

UNITED STATES PATENT OFFICE.

WALTER A. HEATH, OF CHICAGO, ILLINOIS, ASSIGNOR TO HIMSELF, EDWARD F. BRAREN, AND RICHARD PHILPOTT, OF SAME PLACE.

VALVE FOR AIR-COMPRESSORS.

SPECIFICATION forming part of Letters Patent No. 527,787, dated October 23, 1894.

Application filed February 20, 1892. Serial No. 422,310. (No model.)

*To all whom it may concern:*

Be it known that I, WALTER A. HEATH, a citizen of the United States, residing at Chicago, in the county of Cook and State of Illinois, have invented certain new and useful Improvements in Valves for Air-Compressors, of which the following is a specification, reference being had to the accompanying drawings, in which—

Figure 2:
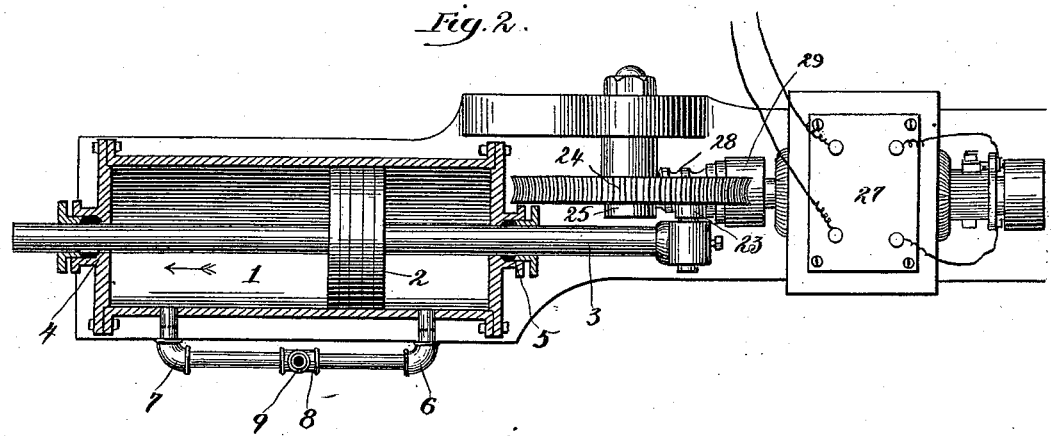
Figure 1:
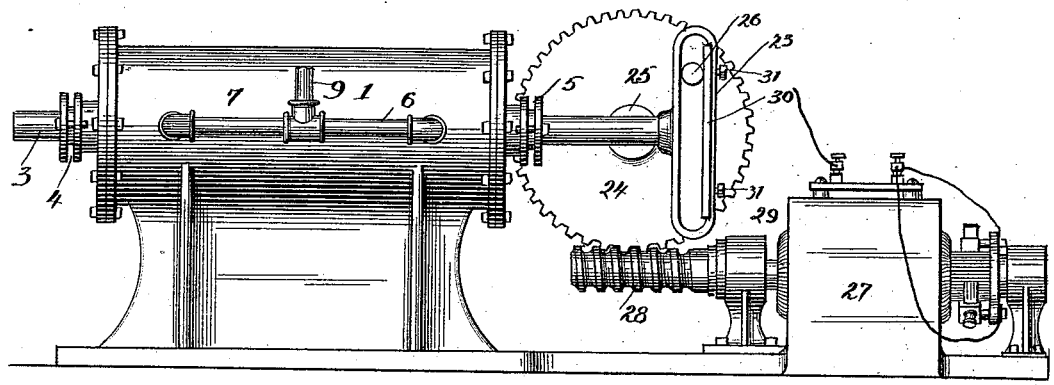
Figure 3:
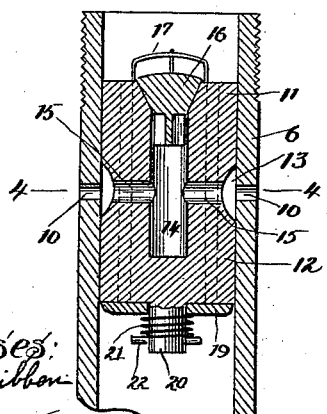
Figure 4:
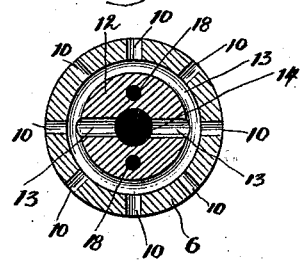

Figure 1 is a side elevation of an air compressing apparatus. Fig. 2 is a top or plan view, the cylinder being in section. Fig. 3 is an enlarged detail, being a central longitudinal section of one of the valves and the pipe in which it is fitted; and Fig. 4 is an enlarged detail, being a vertical cross section on line 4—4 of Fig. 3.

My invention relates to air compressors which are particularly adapted for use in compressing air for use in setting brakes on cars.

The principal object of my invention is to provide a new and improved valve for use with air compressors of the class described. I accomplish this object as illustrated in the drawings and as hereinafter specified.

That which I regard as new will be pointed out in the claims.

In the drawings,—1, indicates the cylinder of an air pump.

2, indicates a solid piston head, operating in the cylinder 1.

3, indicates a piston rod on which is mounted the piston head, which rod extends centrally through the cylinder 1, as shown in Fig. 2; stuffing boxes 4 and 5 being provided at each end of the cylinder. By this construction, as the piston operates it is held steady and its action is regular and smooth.

6 and 7 indicate pipes which open into the cylinder 1 near the opposite ends thereof, as shown. The pipes 6, 7, are preferably connected together by means of a T-coupling 8, to which connects a pipe 9, leading to a suitable reservoir for compressed air. Each of the pipes 6, 7, is provided with perforations 10, which are located around the pipe at suitable intervals, as best shown in Fig. 4. The perforations 10 are preferably located near the cylinder 1, as shown in Fig. 2.

11, indicates a double back pressure valve, one of which is fitted into each pipe 6 and 7.

12, indicates the body of the valve 11, which is cylindrical in shape, and is of such size as to fit tightly into one of the pipes 6 or 7. The body 12 is provided with a peripheral groove 13, a central longitudinal chamber 14, and radial passages 15 which passages afford communication between the peripheral groove 13 and the central longitudinal chamber 14, as best shown in Fig. 3. The body 12 is so placed in its pipe 6 or 7 that the groove 13 will lie opposite the perforations 10 in the pipe, as shown in Fig. 3. The chamber 14 extends from the radial passages 15 to one end of the body 12 of the valve 11, and is flared at its end, as shown in Fig. 3.

16, indicates a tapered plug, which is seated in the flared end of the chamber 14, as shown, and is adapted to tightly close the end of such chamber against external pressure.

17, indicates a guard formed over the end of the chamber 14, which guard is adapted to prevent the plug 16 from moving too far away from its seat.

18, indicates passages, which extend longitudinally through the body 12 of the valve, as indicated by dotted lines in Fig. 3.

19, indicates a ring, which is mounted upon a pin 20 which projects centrally from the end of the body 12 opposite that in which is seated the plug 16, which ring is adapted to fit over the end of the body 12 to close the ends of the passages 18, as best shown in Fig. 3.

21, indicates a spring, mounted upon pin 20, one end of which spring bears against the ring 19 and the other against a cross-bar 22 in the pin 20, by which construction the spring 21 operates to hold the ring 19 closely upon the end of the body 12.

The body 12 is so placed in the pipe 6 or 7 that the end in which is mounted the plug 16 will lie next to the cylinder 1.

The operation of the valve is as follows:— Supposing the piston head 2 to be moving in the direction indicated by the arrow in Fig. 2, air would be drawn through the perforations 10 in the pipe 6 into the groove 13, and would thence pass through the radial passages 15 into the central chamber 14. The plug 16 being moved from its seat by the pressure caused by the partial vacuum in the cylinder, the air will pass from the chamber 14 into the cylinder. Compressed air from the reservoir will be prevented from entering the cylinder by reason of the fact that the ring 19 will close the passages 18 and prevent the passage of the air in that direction. At the same time, by moving the piston head in the direction indicated, an outward pressure will be brought to bear upon the plug 16 in the pipe 7, thereby forcing said plug tightly upon its seat and closing the passage into the chamber 14. Air from the cylinder in front of the piston, however, will be allowed to escape into the pipe 7 through the passages 18, as the pressure of the air will force the ring 19 back from the end of the body 12 of the valve and open the passages 18. From the pipe 7 the air will pass to the reservoir. When the piston head 2 moves in an opposite direction, the action of the valves will be reversed.

Although my improved valve is intended particularly for use with air compressors, I do not wish to limit myself to such use, as it may be used for any other purpose to which it is adapted.

That which I claim as my invention, and desire to secure by Letters Patent, is—

1. A valve consisting of an exterior tube or casing, a valve body therein, one or more passages for permitting external air to flow through said body into the casing at one end of said valve body, means for preventing back flow through said passages, one or more passages extending through said valve body for permitting air from said end of the casing to flow in a reverse direction through said valve body, and means for preventing back flow through the latter passages, substantially as described.

2. A valve for air-compressors, consisting of a perforated valve casing and a valve body having one or more passages for permitting atmospheric air to flow into the compressor chamber, means for preventing back flow, one or more passages through said valve body for permitting compressed air to flow therethrough, and means for preventing back pressure through the latter passages, substantially as described.

3. An organized air compressor combining in its structure the following elements, to wit: a cylinder containing a piston, pipes opening into the cylinder near its opposite ends, and valve bodies arranged in said pipes, each of said valve bodies having one or more passages for permitting external air to flow therethrough into said cylinder, means for preventing back flow through said passages, one or more passages in each of said valve bodies for permitting compressed air to flow therethrough from said cylinder, and means for preventing back flow through the latter passages, substantially as described.

4. An air compressor, consisting of the following elements, to wit: a cylinder containing a piston, a reservoir pipe for conducting air from the cylinder, a piston head operating in said cylinder, pipes opening into said cylinder near its opposite ends and communicating with said reservoir pipe, valves arranged in said pipes and each composed of a valve body having one or more passages for permitting external air to flow therethrough into said cylinder, means for preventing back flow through said passages, one or more passages extending through each of said valve bodies for permitting compressed air from said cylinder to flow into said reservoir pipe, and means for preventing back flow through the latter passages, substantially as described.

5. The combination with a pipe, having perforations 10, of a valve body 12, having a central chamber 14, radial passages 15 communicating with said perforations 10, plug 16 for closing said chamber 14, longitudinal passages 18, and means for closing one end of said longitudinal passages against the flow of air in one direction, substantially as described.

6. The combination with a pipe, having perforations 10, of a valve body 12, having a peripheral groove 13, radial passages 15 communicating therewith, central chamber 14, plug 16 seated in the end of said chamber 14, longitudinal passages 18, ring 19 for closing one end of said passages 18, and spring 21 bearing upon said ring 19, substantially as described.

WALTER A. HEATH.

Witnesses:
JOHN WHITE,
JOHN L. JACKSON.